United States Patent [19]

DeFrancesco et al.

[11] Patent Number: 4,598,367
[45] Date of Patent: Jul. 1, 1986

[54] FINANCIAL QUOTATION SYSTEM USING SYNTHESIZED SPEECH

[75] Inventors: James DeFrancesco, Ellicott City; Scott L. Freiman, Pikesville, both of Md.

[73] Assignee: Financial Design Systems, Inc., Ellicott City, Md.

[21] Appl. No.: 551,130

[22] Filed: Nov. 9, 1983

[51] Int. Cl.[4] .................. G06F 15/20; G07G 1/12; G10L 5/02
[52] U.S. Cl. .................. 364/408; 364/405; 364/200; 364/900; 381/51
[58] Field of Search .............. 364/401, 403, 404, 405, 364/406, 407, 408, 900, 200; 179/2 DP; 381/51, 52, 53

[56] References Cited

U.S. PATENT DOCUMENTS

| | | | |
|---|---|---|---|
| 4,016,540 | 4/1977 | Hyatt | 340/172.5 |
| 4,060,848 | 11/1977 | Hyatt | 340/172 S |
| 4,211,892 | 7/1980 | Tanimoto et al. | 179/1 SM |
| 4,264,782 | 4/1981 | Konheim | 364/200 X |
| 4,276,444 | 6/1981 | Tanimoto et al. | 179/1 SM |
| 4,369,334 | 1/1983 | Nakatani et al. | 179/1 SM |
| 4,482,976 | 11/1984 | Ishikawa | 364/405 X |
| 4,489,438 | 12/1984 | Hughes | 381/51 |

OTHER PUBLICATIONS

Carl Loan Disclosure System brochure, copyright 1983, Financial Design Systems, Inc.

*Primary Examiner*—Jerry Smith
*Assistant Examiner*—Jon D. Grossman
*Attorney, Agent, or Firm*—Fleit, Jacobson, Cohn & Price

[57] ABSTRACT

An automated financial quotation system for audibly eliciting identification and input information from a user located at a remote terminal, and on the basis of this information, calculating and transmitting a synthesized audible representation of a financial disclosure statement to the remote terminal. The input information includes identification information and at least one variable from which the financial disclosure statement is calculated. The identification information may include user identification and/or identification of the transaction to be performed, preferably modelled by a processor under control of programmed instructions and stored data. The system includes means for requesting or eliciting the identification and input information, means for verifying and/or confirming at least those portions of the input information from which the financial disclosure statement is determined and/or calculated, and a speech synthesizer controlled by the processor and/or phoneme command signals for generating phonemes of speech representative of the processed financial disclosure statement. An alternative embodiment of the invention also includes a storage module for storing processed financial disclosure statements along with a V-code generated by the system so that a particular financial disclosure statement may be recalled when the V-code is later supplied to the system to retrieve the calculated disclosure statement in anticipation of consummating a transaction.

7 Claims, 6 Drawing Figures

FINANCIAL QUOTATION SYSTEM USING SYNTHESIZED SPEECH

BACKGROUND OF THE INVENTION

1. Field of the Invention

This invention pertains to an automated financial data disclosure system, but more specifically, to a method and apparatus for audibly eliciting input information and for audibly announcing financial disclosure information computed on the basis of the input information.

In the business of dealing with, lending or managing financial accounts of any kind, such as investments, annuities, insurance and IRA accounts, where the transaction depends on such factors as amortization, interest rates, reserve fees, etc., it is often desired to learn how these factors affect terms of the transaction in order to intelligently decide whether the transaction is desirable in terms of affordability or profitability. In many prior art systems, schedules or tables contained in books and the like are used to provide some indication of the terms. Usually, these tables are only estimates and are not as precise as the terms ultimately processed by a centrally located processing system where accurate terms and conditions of the transactions are revealed.

With the advent of microcomputers, this same information can be had quickly and precisely, however, the use of such microcomputers have presented some difficulties, most noteably in the area of "man-machine interface", i.e., the transfer of data between the user and the machine. Many prior systems attempt to design "user friendliness" in the machine, particularly by providing speech capability therein. In doing so, one difficulty experienced is attaining high quality speech output that is intelligible and has the flexibility to accommodate the nature of the transaction. Another difficulty is providing an easily understood interactive capability.

A prior financial disclosure system employing synthesized speech is disclosed in U.S. Pat. No. 4,369,334 to Nakatani et al. In the Nakatani et al system, an electronic cash register is equipped with synthetic speech means for audibly announcing the total amount of transaction and the change to be handed a customer in response to information supplied by a user via a keypad. Rather than generating segments of speech in the nature of phonemes to produce an audio announcement of the transaction, Nakatani et al employs a storage module for storing pre-recorded speech data, a portion thereof being selected in dependence on the calculated total amount of the transaction or the change. Moreover, the Nakatani et al system is operated locally, rather than from a remote location and thus is not suitable for eliciting input information or for coupling and responding to various conventional telephone exchange control signals.

U.S. Pat. Nos. 4,211,892 and 4,276,444 both being issued to Tanimoto et al each disclose synthetic speech calculators for generating audible sound signals that produce speech in response to calculated numerical information supplied via a keyboard. Again, the Tanimoto et al systems are operated locally, rather than remotely, and do not possess mechanisms for audibly eliciting input information from which additional financial information is to be calculated and transferred remotely by audible means. Further prior art is also disclosed in U.S. Pat. Nos. 4,016,540 and 4,060,848 each being issued to Hyatt. The Hyatt systems show an interactive data processing control system employing synthesized speech for communicating with an operator either remotely or locally. The Hyatt systems primarily are used for generating control signals to control a device in response to information input by keying means or audio means, however, no means for audibly eliciting information is disclosed.

2. Objects

In view of the foregoing, it is a primary objective of the present invention to provide system for audibly eliciting certain input information, for calculating output information on the basis of the input information, and for audibly announcing the results of the calculated output information to a user at a remote location.

It is another objective of the present invention to provide an automated financial disclosure system for audibly quoting financial data in response to user identification and input information.

It is a further objective of the present invention to provide an automated financial disclosure system suitable for use with conventional telephone networks whereby the same may be operated remotely.

It is yet a further objective of the present invention to provide an automated financial disclosure system for generating disclosure data and for storing the same for later recall when a financial transaction associated with the disclosure information is consummated.

It is still another objective of the present invention to facilitate the entry of input parameters constituting the input information by providing means for audibly verifying the same as it is received by the system thereby to enable correction when a mistake is made.

Finally, without limitation, it is a further objective of the present invention to provide an automated financial disclosure system having such flexibility as to enable a user thereof to obtain recalculations of disclosure information based upon new input information and, once performed, to obtain an audible quotation thereof.

SUMMARY OF THE INVENTION

To obtain these and additional objects, advantages, and features, the invention comprises an automated financial quotation system for audibly eliciting identification and input information from a user located at a remote terminal, and on the basis of this information, calculating and transmitting a synthesized audible representation of financial disclosure statement to the remote terminal. The input information includes identification information and at least one varible from which the financial disclosure statement is calculated. The identification information may include user identification and/or identification of the transaction to be performed.

A preferred system for carrying out the invention includes a call monitor responsive to telephone calls to generate a control signal which, in turn, activates the system components. The system components include registers for receiving input information sent from the remote terminal via, for example, telephone lines, a synthetic speech generator responsive to phoneme command signals generated by a processor, and a transmitter for sending speech signals to the remote terminal over the telephone lines. Additional components of the system, preferably modelled by a processor under control of programmed instructions and stored data, includes means for requesting or eliciting the identification and input information, means for verifying and/or confirming at least those portions of the input information from which the financial statement is determined and/or calculated, and the speech synthesizer controlled by the processor and/or phoneme command signals for generating phonemes of speech representative of the processed financial statement. An alternative embodiment of the invention also includes a storage module for storing processed financial statements along with a V-code generated by the system so that a particular financial statement may be recalled when the V-code is later supplied to the system to retrieve the calculated disclosure statement in anticipation of consummating a transaction.

Other features, advantages and aspects of the invention will become apparent upon review of the following description taken in connection with the accompanying drawing and program listing in the appendix. The invention, however, is pointed out with particularity by the appended claims.

DESCRIPTION OF ILLUSTRATIVE EMBODIMENT

Figure 1:
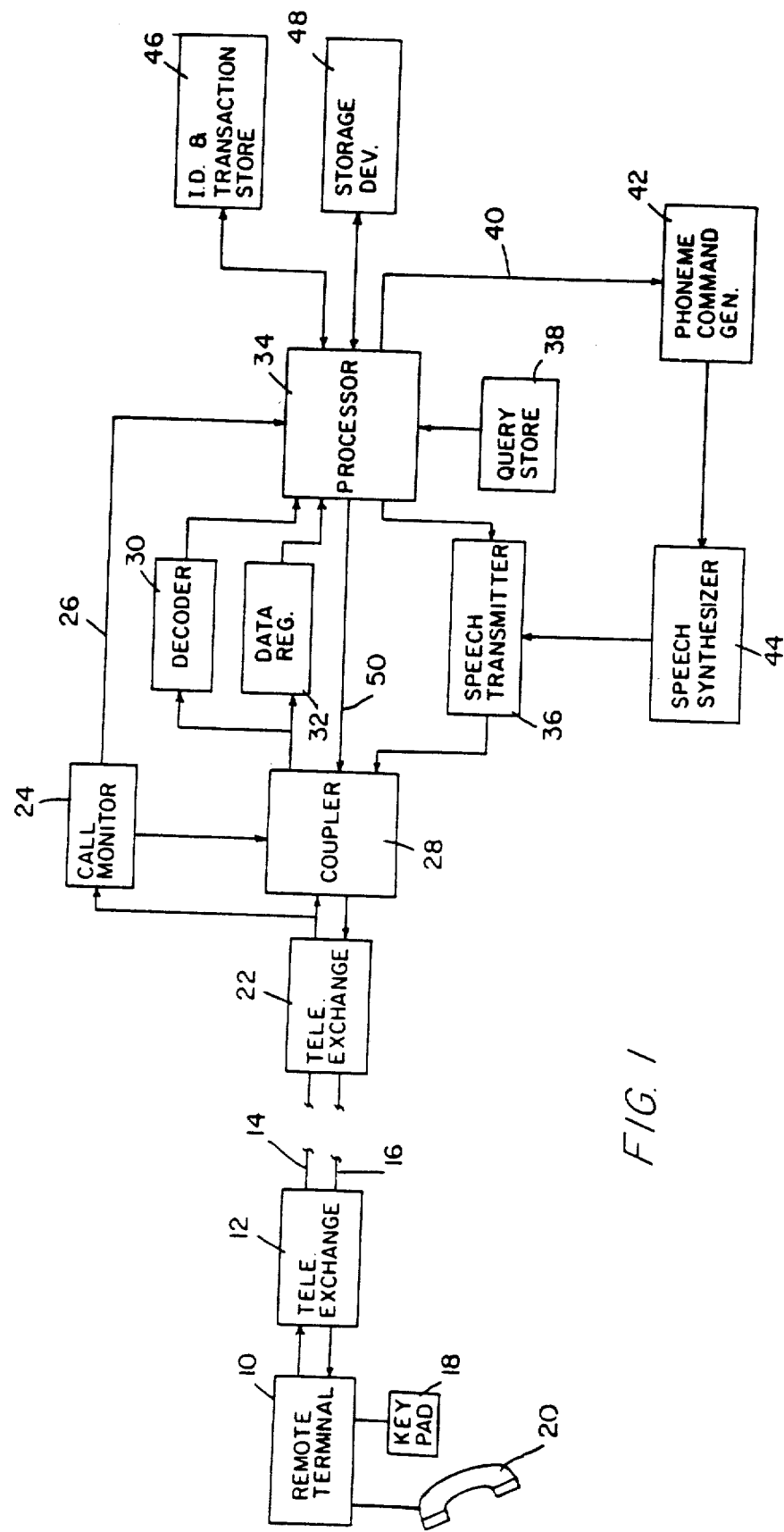
FIG. 1 depicts a block diagram of a preferred system for carrying out the invention; and, FIGS. 2a through 2e present the flowchart for the system.

FIG. 1 typifies, in block diagram, a system for eliciting input information, and in response to the information elicited, generating financial disclosure data and audibly sending the same back to a requesting terminal. As depicted in the drawing, a remote terminal 10 couples the telephone exchange 12 for sending identification and input information over telephone lines 14 and 16. The information is generated by a keypad generator 18 connected to the terminal 10. The terminal 10 also includes a telephone handset 20 which includes conventional audible means for producing speech.

At the receiving end of the communication system, a telephone exchange 22 receives the information transmitted from the remote terminal 10. A call monitor 24 couples the telephone exchange 22 for monitoring received calls. In response to a received call, the call monitor 24 generates a CONNECT signal on conductor 26 and also enables a coupler 28 connected to the exchange 22 for passing information to a decoder 30 and data register 32. The CONNECT signal on line 26 alerts a processor 34 that a call is incoming and thereafter, places the system in a condition to control peripherals and other elements of the system to carry out the stated functions of the invention. In practice, the processor 34 is constituted by an Apple 2E or Apple Plus microcomputer containing the program listed in the Appendix.

In response to an incoming call, the processor 34 activates a speech transmitter 36 so that initial inquiries can be transmitted through the coupler 28 back to the remote terminal 10 and audibly conveyed to the user. Queries are stored in a query store 38 and are used by the processor 34 to generate phoneme command signals via conductor 40. The phoneme command signals are then supplied to a phoneme command generator 42 which controls a speech synthesizer 44. The speech synthesizer 44 of the present invention comprises a connector board for attachment to, for example, on Apple 2 Plus or Apple 2E microcomputer, specifically known by part number V-100 or V-120 commercially available from Vynet Corporation of Los Gatos, Calif.

The synthesizer 44 used in the preferred embodiment was developed by Texas Instruments Corporation.

During its initial operation, the system of FIG. 1 elicits information from the user, such as user identification number, a transaction I.D. number, and certain input variables (required input data) or parameters used in determining the financial information to be audibly transmitted to the user. When the system is first placed on line in response to a call, the query store 38 initially supplies requesting information that asks for the user identification number and the identification of the transaction to be computed. This requested information, when transmitted, is initially transferred to the data register 32 for subsequent processing by the processor 34. Once the processor 34 receives and verifies a user identification number, it then proceeds to determine what input variables or parameters are necessary in order to generate the financial statement.

The transaction number supplied by the user is used by the processor 34 to access an I.D. and transaction storage device 46 for determining exactly what parameters are necessary. When the parameters are received, the processor 34 then elicits each of the necessary parameters (each of the required input data) from the user by recalling various queries stored in query store 38 and audibly transmitting the same via the phoneme command generator, speech synthesizer 44 and speech transmitter 36. The queries are sent via the coupler over the telephone exchange 22 to the user, and in reply, the user enters the input variables by the keypad 18.

Upon transmission of a variable (input data) by the keypad 18, it is stored in the data register 32 whereupon the processor 34 retrieves the variable from the data register 32 and audibly confirms that variable. Verification is accomplished by generating further phoneme command signals over the conductor 40 that audibly repeat the transmitted variable. These further phoneme command signals generate speech sounds which are transmitted back to the user, while the speech transmitter 36 and coupler 28 operating as previously explained. In this manner, the user, as the information is entered, can verify that it was entered correctly.

Figure 2A:
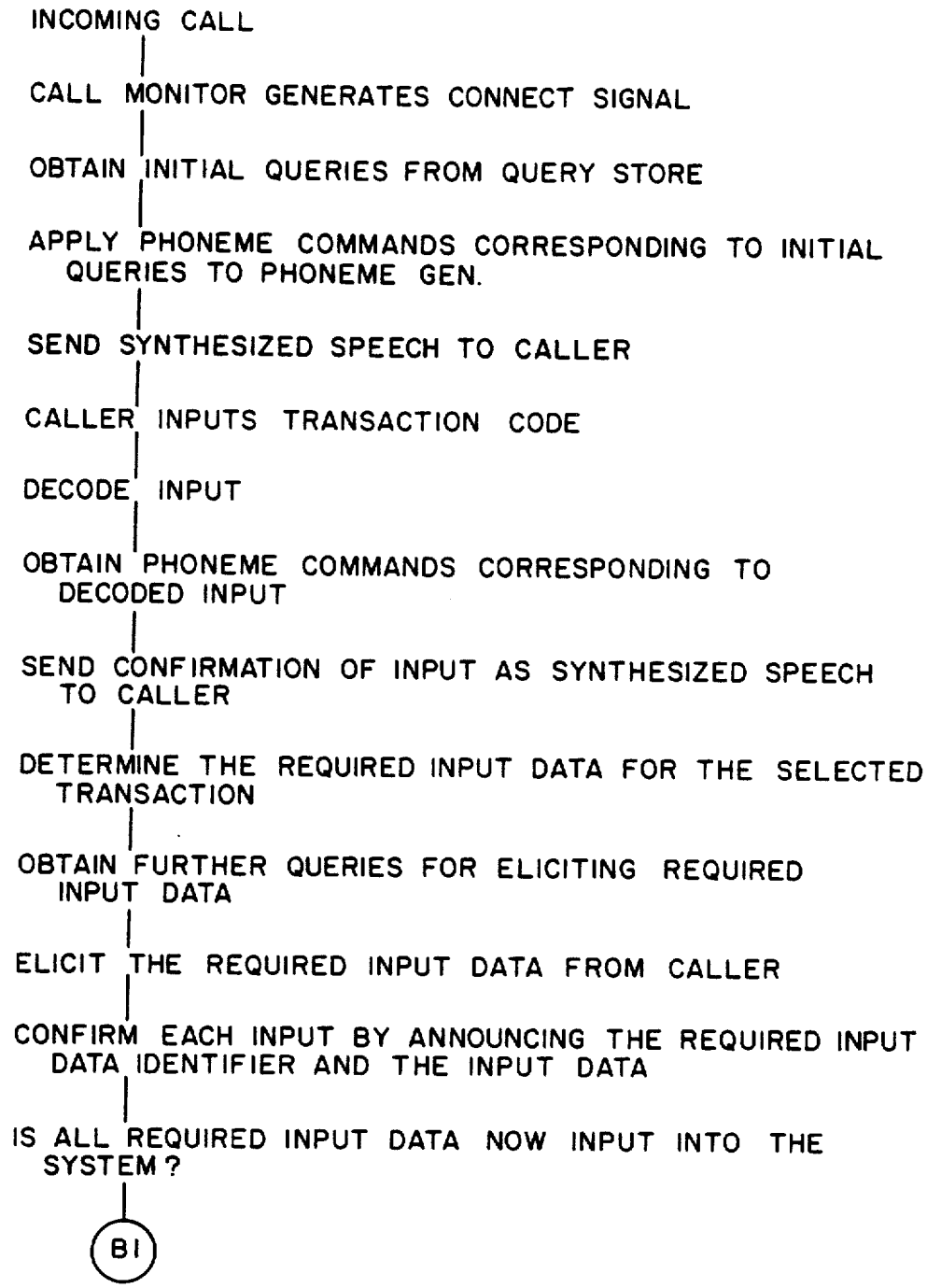

Upon receiving a predetermined number of input variables, the processor initiates its routines, subsequently described, to process the input data for producing the financial disclosure statement. The above operational steps are depicted in FIG. 2a. The processor 34 may include a conventional memory for storing the processed data, or alternatively, the data of the financial statement, i.e., the plurality of financial disclosure statement turns, may be temporarily or permanently placed in the storage device 48. After completion of computation, a full or partial financial statement (depending on other control signals) then is audibly transmitted back to the user by the processor generating further phoneme command signals and supplying the same over the conductor 40. For comparison purposes, the user may only desire quotation of a few of the terms of the transaction, e.g., a partial disclosure of monthly payments (or the most significant financial disclosure term), and then once a partial disclosure satisfies the inquiry, the user may obtain a full and complete disclosure of the computed terms. Whether a full or partial disclosure is given depends upon certain input control symbols. In other words, the significant disclosure term such as the monthly payment figure is audibly announced and thereafter, upon sending a full disclosure command control signal from the remote terminal, all the terms of the disclosure statement are audibly announced, i.e., disclosed to the user.

Figure 2B:
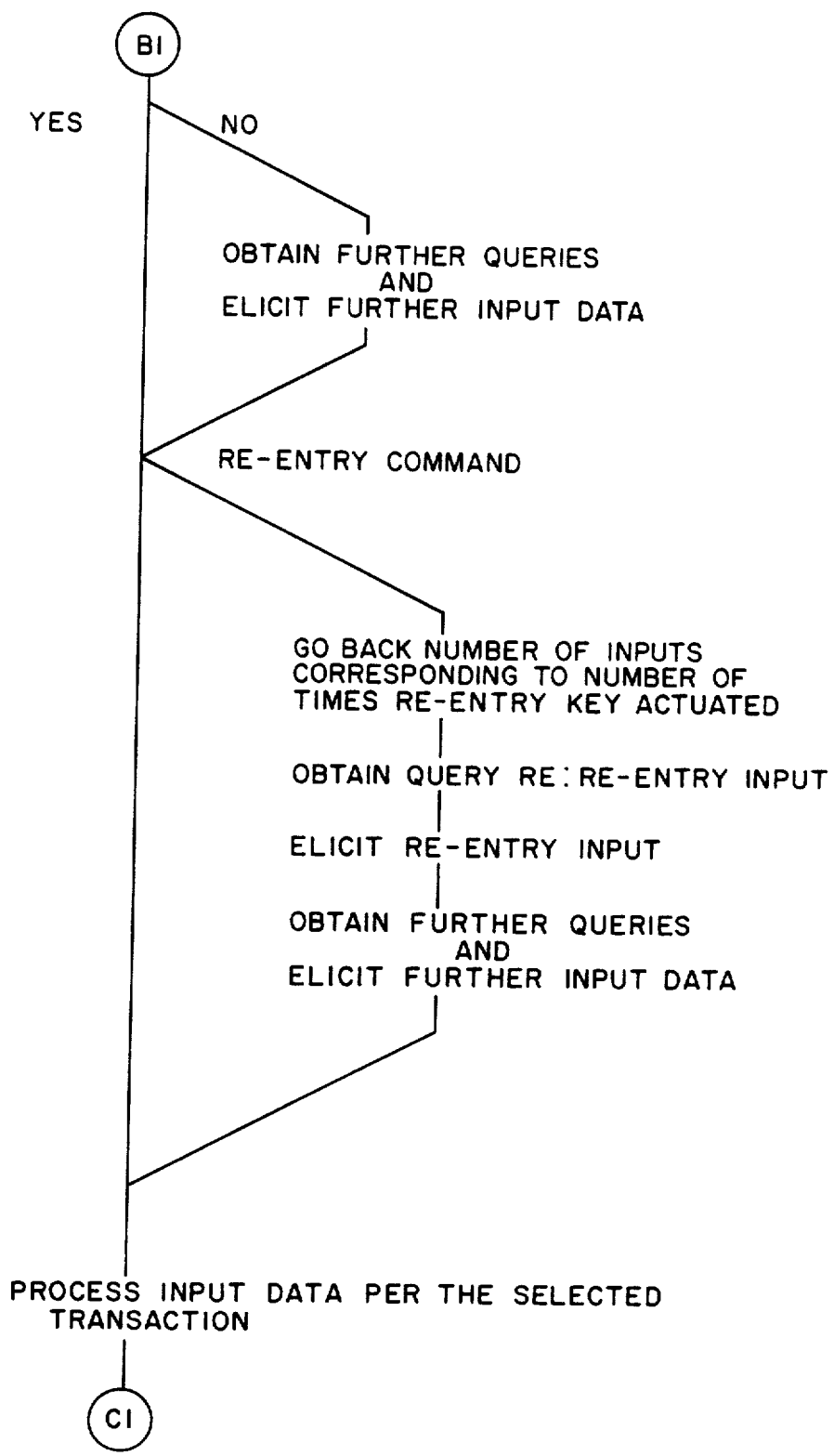
Figure 2C:
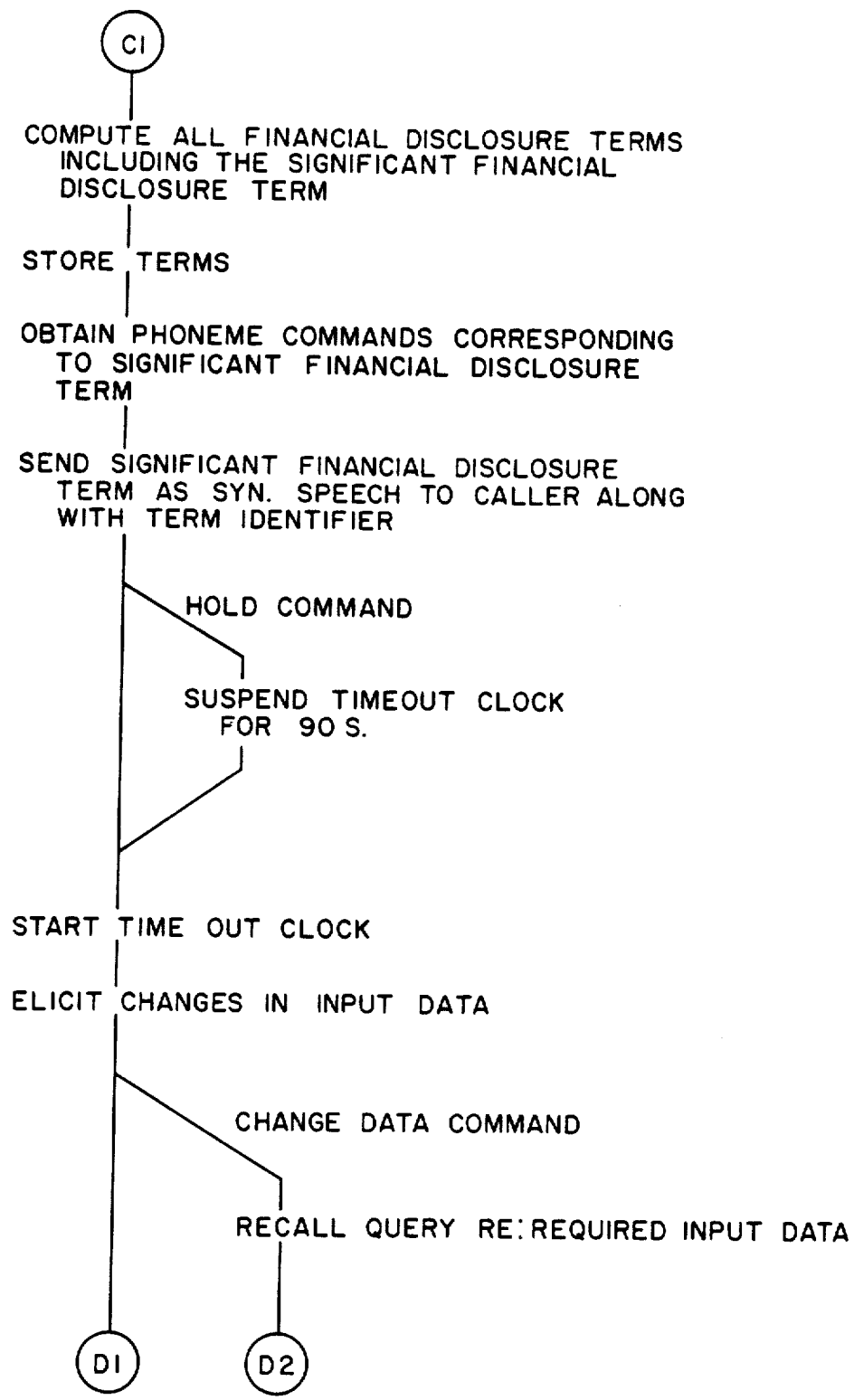
Figure 2D:
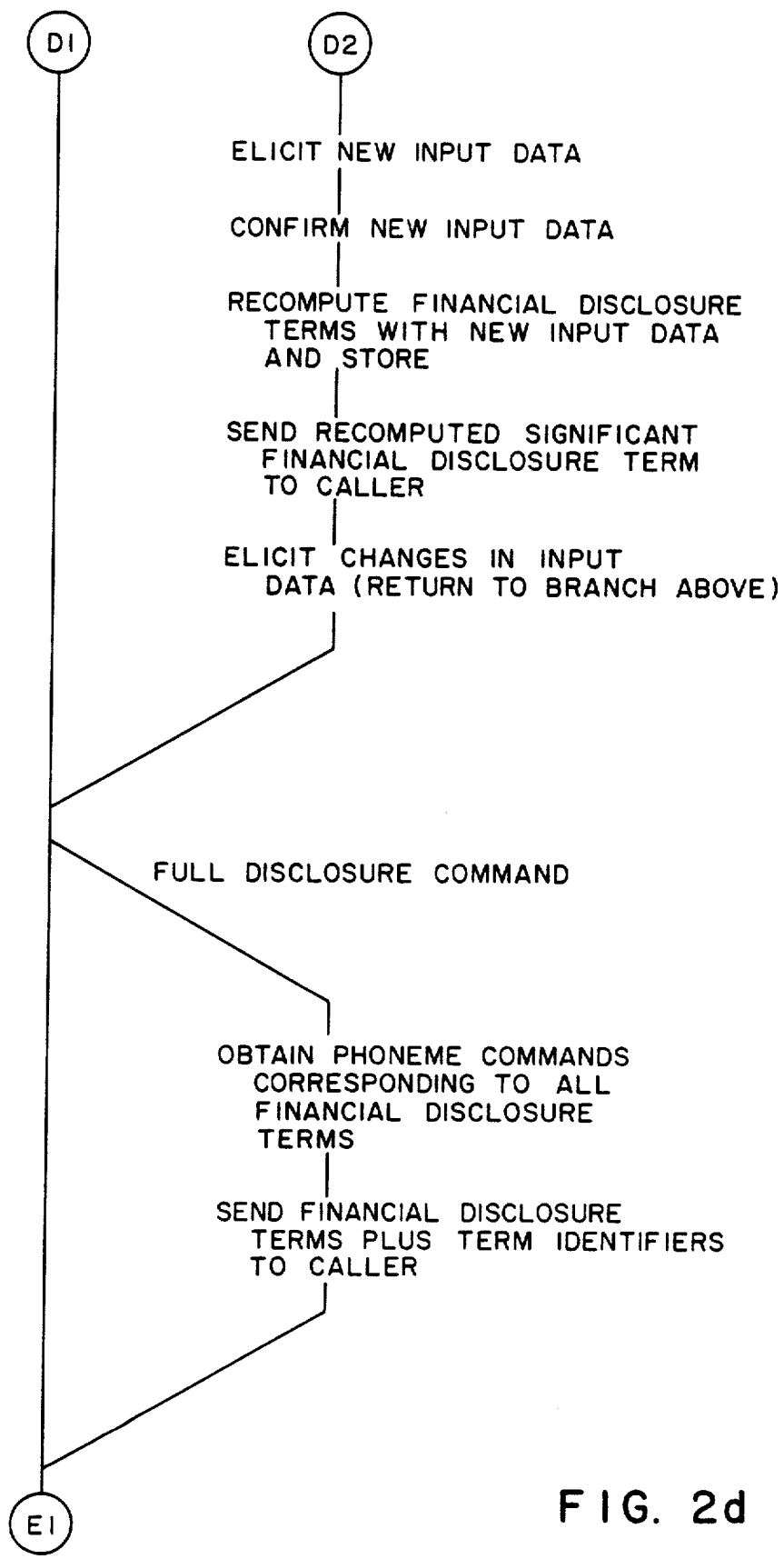

Occasionally, the user may make a mistake in entry of the variables in which case the user may send a re-enter control signal by a special key, such as the "#" symbol on a conventional telephone keypad 18. See FIG. 2b. This re-enter control signal also is transmitted, in duplex, over the telephone exchanges 12 and 22 and, since the coupler has previously been activated, is transferred to the decoder 30. The decoder 30 senses and decodes the re-enter control signal thereby to alter the operative sequence of the processor 34 in a manner whereby certain input information is re-requested or elicited again. By way of illustration, the "#" key may be depressed twice to generate the re-enter control signal during the stage where the processor 34 elicits each of the input variables for the identified transaction. The processor 34 may be conventionally programmed to respond by "backing up" in the sequence of requesting information variables once for each time the "#" key is depressed and transmitted. Accordingly, the user may correct any number of mistakes as they occur. During re-entry, of course, the processor also verifies the input information in the same manner as previously stated. The flowchart of FIG. 2b shows the re-entry command and the flowchart of FIGS. 2c and 2d show the change data command which is essentially the same as the re-entry routine except that the user selects the input variable to be changed by actuating a key corresponding to that variable.

An additional feature of the invention enables the processed financial statement to be stored and recalled at a later date. To provide this feature, the processor 34 has the capability in its operating system, to generate a specialized "V-code" or verification code associated with each processed financial statement, and for storing the processed disclosure statement in the storage module 48. At some subsequent time period, a user located at a remote terminal 10 may enter a recall control signal, such as the "ZERO" key on a conventional telephone keypad at the point where the transaction I.D. is requested. This recall control signal is sensed by the decoder 30 whereupon the processor 34 responds by standing ready to either request a certain V-code or receive a V-code from the user thereby to enable it to retrieve the previously stored financial disclosure statement from the storage device 48 and to audibly transmit that information to the user, in the same manner as previously explained. This feature allows earlier stored information to be recalled when, for example, the transaction is subsequently consummated.

Thus, it is seen that, in the illustrative system, the decoder 30 and the data register 32 constitutes a receiving means for receiving identification, input and control information while the processor 34 and query store 38 constitute a requesting means for eliciting the input information and for verifying it as it is entered. The processor 34, together with the speech synthesizer and other system components, establish a quoting means for generating further phoneme command signals thereby to audibly announce the financial disclosure statement, once determined on the basis of the input information.

Figure 2E:
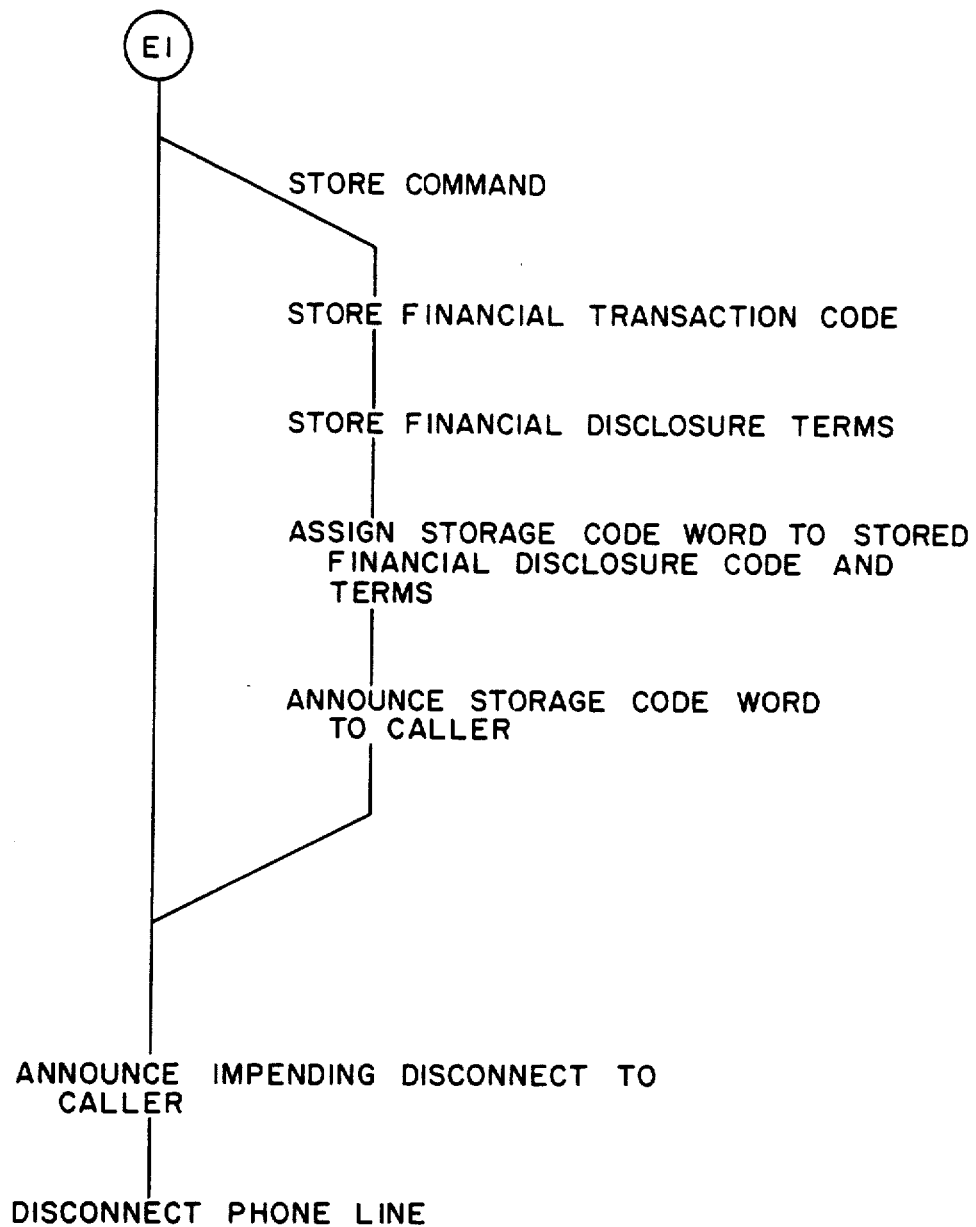

An additional feature of the invention automatically disconnects the system from the telephone exchange 22 when no input information is received therethrough after a predetermined time period, such as, for example, twenty seconds. To perform this feature, a processor 34 continuously monitors input information transferred to the decoder 30 and the data register 32, and after the time-out period, effects generation of a "chirping" sound notifying the user of an impending disconnect. Disconnect is effected by way of a disconnect control signal on conductor 50 which is supplied to the coupler 28 thereby to disconnect the system from the telephone exchange. The time out clock is noted on FIG. 2c and the disconnect is shown on FIG. 2e. If however, the user desires to continue his connection, he (or she) simply transmits a HOLD signal, e.g., the symbols "*#" on the keypad, which symbols are then monitored by the processor 34 via the decoder 30 to restart the time out period for, say ninety seconds. The ninety second delay interval may be repeated by re-entry of the HOLD signal. See FIG. 2c.

A preferred embodiment of the system for carrying out some of the stated functions employs a general purpose Apple 2 Plus microcomputer that is programmed in BASIC in a fashion to implement the aforestated functions. The program essentially comprises a set of instructions for controlling the speech synthesizer and peripheral devices attached thereto. A number of sub-routines are employed by the main routine for calculating various financial statements depending on the type of transaction required. In the preferred embodiment of the invention, the financial disclosure statement includes a plurality of financial disclosure terms: principal, interest, fees, credit life premiums, accident and health premiums, amount financed, total of payments, and percentage rates, financial reserves, and any other general information pertinent to the transaction. The other instructions for producing the desired financial disclosure statement are well within the knowledge of the skilled programmer, and for that reason, will not be described here.

The foregoing only is an illustration of a preferred system for carrying out the stated objectives. Further, the term "financial statement" is used in a broad sense and is not limited to that which is described. Other improvements, alterations and modifications can be made to the system as illustrated without departing from the true scope of the invention. Accordingly, it is the intent to include all such modifications and alterations as may come within the scope of the appended claims.

What is claimed is:

1. A financial quotation system for audibly eliciting input information and for generating and transmitting a plurality of financial disclosure statement terms in accordance with identification information, control information, and financial input information sent by a user from a remote terminal which includes audio means for announcing speech and keying means for generating and sending said identification, control and financial input information, said identification information including a transaction I.D. signal identifying at least one financial transaction which along with said financial input information is the basis for producing said plurality of financial disclosure statement terms, said financial input information including at least one input variable representative of a financial value, and said control information including a control signal, said system comprising:

a call monitor coupled to said remote terminal for responding thereto and for producing a connect signal;

receiving means for receiving said identification information and said financial input information from said user located at said remote terminal;

synthesized speech means responsive to phoneme command signals for generating synthesized speech signals;

transmitting control means for generating a transmit control signal;

speech transmitting means coupled to said synthesized speech means, coupled to said transmitting control means and being responsive to said transmit control signal for sending said synthesized speech signals generated by said synthesized speech means to said remote terminal;

requesting means coupled to said call monitor and responsive to said connect signal for generating phoneme command signals and for supplying said phoneme command signals to said synthesized speech means for audibly eliciting said identification information and said financial input information from said user at said remote terminal;

verifying means for confirming said at least one input variable representative of said financial value by generating further phoneme command signals and supplying said further phoneme command signals to said synthesized speech means thereby to effect audible announcement of said at least one input variable received by the system so that the user may confirm the correctness of entry of said at least one input variable;

processing means coupled to said receiving means for processing said financial input information and said at least one input variable thereby to generate processed information and said plurality of financial disclosure statement terms representative of said financial disclosure statement based upon said transaction I.D. and said at least one input variable;

quoting means coupled to said processing means for generating additional phoneme command signals to said synthesized speech means thereby to effect audible announcement of a significant financial disclosure statement term which is one of said plurality of financial disclosure statement terms to said user located at said remote terminal; and, a further quoting means coupled to said processing means for generating other phoneme command signals to said synthesized speech means upon receipt of said control signal thereby to effect audible announcement of said plurality of financial disclosure statement terms to said user.

2. A financial quotation system as recited in claim 1, wherein said remote terminal includes means for providing and sending a re-enter control signal to change said at least one input variable, said re-enter control signal being part of said control information, and said financial quotation system further comprising:

re-requesting means responsive to said re-enter control signal from said remote terminal for generating further speech phoneme command signals and supplying said further speech phoneme command signals to said synthesized speech means for effecting an audible re-request of said at least one input variable to be changed; and said verifying means is further responsive for confirming the received changed input variable by generating phoneme command signals and for supplying said phoneme command signals to said synthesized speech means to effect audio announcement of said received changed input variable.

3. A financial quotation system as recited in claim 2, wherein a plurality of input variables representative of a plurality of financial values are required to generate said financial disclosure statement terms and each input variable has associated therewith a variable identifying signal, and said financial quotation system further comprising:

means responsive to said variable identifying signal transmitted from said remote input terminal for activating said re-requesting means and audibly re-requesting a new variable associated with said variable identifying signal, said verifying means confirming the received new variable, said processing means processing again said input information utilizing said received new variable, and said quoting means announcing a new significant financial disclosure statement term.

4. A financial quotation system as recited in claim 1 wherein said remote terminal is adapted to send a recall control signal as part of said control information, further comprising:

means for generating a verification code associated with the processed information produced by said processing means;

storage means for storing said processed information along with said verification code; and recall means responsive to said recall control signal corresponding to said verification code for activating said further quoting means for effecting the audible announcement of said processed information stored in said storage means associated with said verification code.

5. A system for eliciting required input data for a selected financial transaction, for computing a financial disclosure statement based upon input data and said selected financial transaction, and for disclosing financial disclosure terms which are part of said statement, said selected financial transaction being represented by a transaction code, said transaction code and said input data being entered and sent by a user from a remote terminal which includes means for generating and sending said transaction code, said input data, a change data command and a full disclosure command, said remote terminal including an audio means for announcing synthesized speech signals, the system comprising:

means for responding to said transaction code by identifying said required input data corresponding to said selected financial transaction and by generating and sending to said audio means input data elicitation synthesized speech signals which represent a request to input said required input data at said remote terminal;

means for storing the data input by said user in response to said request;

means for processing the stored input data in accordance with said selected financial transaction and for computing and storing a plurality of financial disclosure terms which includes a significant financial disclosure term;

means for producing significant term synthesized speech signals corresponding to said significant financial disclosure term and sending those signals to said audio means at said remote terminal;

response means for recomputing and restoring said plurality of financial disclosure terms upon receipt of said change data command and for actuating said means for producing in order to disclose the recomputed significant financial disclosure term at said remote terminal; and, further response means for generating and sending disclosure term synthesized speech signals corresponding to said plurality of financial disclosure terms to said remote terminal upon receipt of said full disclosure command.

6. A system as claimed in claim 5 including means for confirming the receipt of said input data by generating and sending data identifier synthesized speech signals and term synthesized speech signals corresponding to said input data.

7. A system as claimed in claim 6 wherein said remote terminal includes further means for generating and sending a reentry data command, and the system includes means for reeliciting the last requested required data input upon receipt of said reentry command, and means for substituting the reentered input data as said last required input data for said selected financial transaction.

* * * * *